United States Patent
Shimola et al.

(10) Patent No.: US 6,927,338 B2
(45) Date of Patent: Aug. 9, 2005

(54) WIRE PASS THROUGH SEAL WITH GROMMETS

(75) Inventors: Gregory W. Shimola, Westlake, OH (US); Daniel Joseph Cellura, Parma, OH (US)

(73) Assignee: The XLO Group of Companies, Inc., Cleveland, OH (US)

(*) Notice: Subject to any disclaimer, the term of this patent is extended or adjusted under 35 U.S.C. 154(b) by 0 days.

(21) Appl. No.: 10/620,823

(22) Filed: Jul. 16, 2003

(65) Prior Publication Data

US 2004/0069521 A1 Apr. 15, 2004

Related U.S. Application Data

(60) Provisional application No. 60/417,391, filed on Oct. 9, 2002.

(51) Int. Cl.[7] .................................................. H02G 3/18
(52) U.S. Cl. .............. 174/65 G; 174/65 R; 174/152 G; 248/56; 16/2.2
(58) Field of Search ..................... 174/65 G, 65 R, 174/152 G, 153 G; 248/56; 16/2.1, 2.2

(56) References Cited

U.S. PATENT DOCUMENTS

| | | | | |
|---|---|---|---|---|
| 3,244,802 A | * | 4/1966 | Sturtevant et al. | ...... 174/153 G |
| 4,901,395 A | * | 2/1990 | Semrau | .......................... 16/2.2 |
| 5,635,678 A | * | 6/1997 | Yasukuni | ................. 174/152 G |
| 6,010,134 A | * | 1/2000 | Katoh | .......................... 277/615 |
| 6,064,003 A | * | 5/2000 | Moore et al. | .............. 174/65 G |
| 6,677,524 B2 | * | 1/2004 | Fukumoto et al. | ......... 174/65 G |

\* cited by examiner

*Primary Examiner*—Dhiru R. Patel
(74) *Attorney, Agent, or Firm*—Fay, Sharpe, Fagan, Minnich & McKee, LLP

(57) ABSTRACT

A tubular grommet for sealing a conductor relative to a substrate having opposite sides and an opening therethrough for the conductor has axially opposite ends, one of which sealing engages with the conductor and the other of which is radially spaced from the conductor, diametrically larger than the opening through the substrate, and includes a radially outwardly extending peripheral flange for engaging against the substrate when the grommet is mounted thereon. A wall between the ends includes first and second re-entrant wall portions facing the one end, and the grommet can be provided with a recess in the wall adjacent the flange for receiving the peripheral edge of the opening through the substrate and/or can be adhesively bonded to the substrate by an adhesive interposed between the flange and substrate.

21 Claims, 2 Drawing Sheets

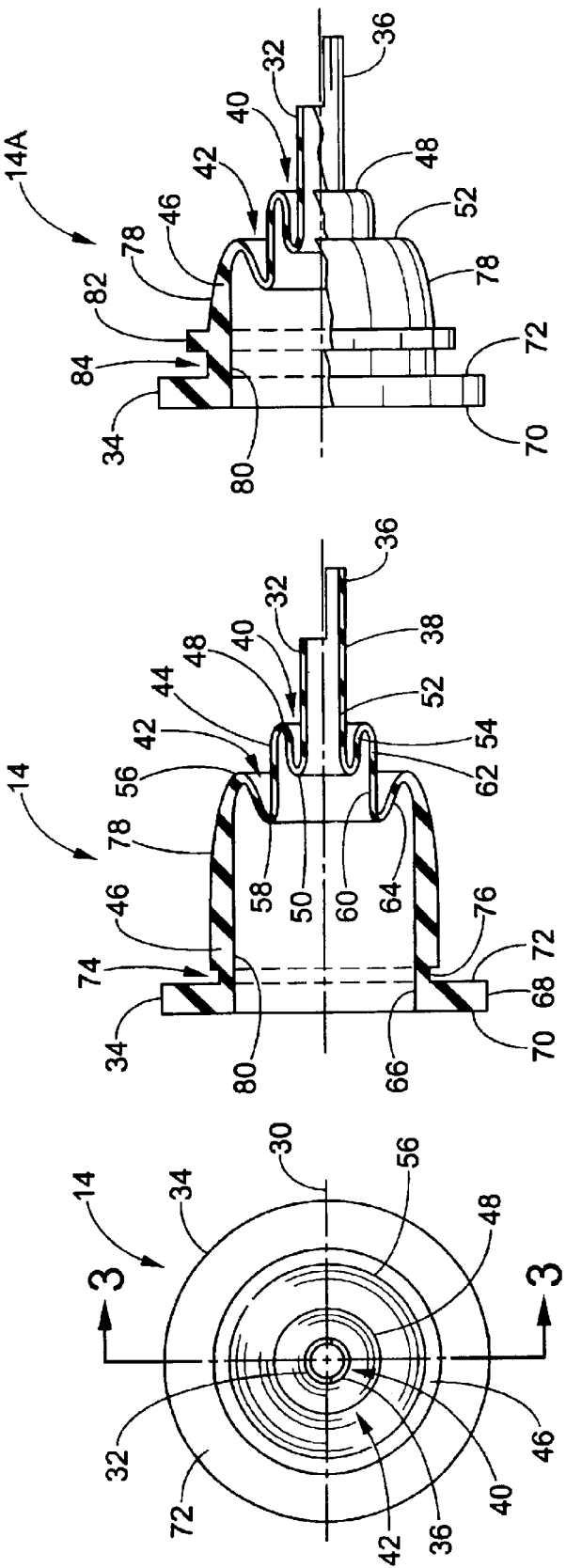

WIRE PASS THROUGH SEAL WITH GROMMETS

This application is based on U.S. Provisional Patent Application Ser. No. 60/417,391 filed Oct. 9, 2002 and claims the benefit thereof.

BACKGROUND OF THE INVENTION

This invention relates to the art of seals and, more particularly, to a grommet for sealing electrical conductors extending through an opening between wet and dry sides of a substrate such as a watershield component.

The present invention finds particular utility in connection with sealing electric wires in a wiring harness extending through a watershield mounted on the inner panel of a vehicle door. Accordingly, the invention will be illustrated and described in detail herein in connection with such use. At the same time, as will become apparent hereinafter, it will be appreciated that the invention is applicable to the sealing of wires relative to the opposite sides of other substrates such as panels, plate components, or the fire wall of a vehicle, for example.

It is known, as shown in commonly assigned prior U.S. Pat. Nos. 4,696,848 and 4,957,803 to provide surface protectors or watershields on the inner panels of vehicle doors to protect the inner panels against the infiltration of water, dirt, dust, air, or the like. Generally, the shields are in the form of thin, flexible sheets of plastic material, such as polyethylene, having a peripheral contour corresponding to that of an inner door panel of a given vehicle. The shields are joined to the panels such as by pressure sensitive adhesive or other suitable fastening arrangements and, in vehicles having powered equipment such as windows, door locks, rear view mirrors, and the like, the electrical wires or wiring harnesses for such equipment pass through the watershield, whereby the conductors need to be sealed relative to the opening therefor in the watershield so as to preclude the ingress of air, water and dirt from the wet to the dry side of the shield. Heretofore, the opening for the conductors has been provided by cutting slits through the shield or, as shown in the above-mentioned U.S. Pat. No. 4,957,803 by providing a pocket comprising a plurality of closely spaced corrugations extending about a central opening through which a conductor extends. A portion or portions of the corrugations adjacent the opening are adhesively bonded to the conductor to optimize sealing therebetween.

The mere provision of slits in the shield for wires makes sealing across the shield extremely difficult, whereby the ingress of air, water and dirt across the shield to the dry side thereof remains a problem. While adequate sealing is achieved with the corrugated pocket arrangement described above, desired positioning of the conductor ends relative to the opposite sides of the shield is difficult to achieve because of the presence of the adhesive about the opening through which the conductors are passed. Further, if it becomes necessary to remove and replace the wires, the adhesive bonding between the pocket and wires resists separation thereof, making such removal difficult and, possibly, resulting in damage to the shield. Still further, if there is an electrical connector on an end of the wires which is diametrically larger than the conductors, assembly of the wires with the shield becomes difficult and sometimes impossible in that the connector cannot pass through the opening provided for the wires and, if the latter is enlarged such as by cutting, then sealing of the enlarged pocket opening with the wires can be a problem.

SUMMARY OF THE INVENTION

In accordance with the present invention, a sealing arrangement for conductors extending through an opening between wet and dry sides of a substrate such as a watershield component includes a grommet by which the foregoing and other disadvantages encountered in connection with the prior art are advantageously minimized or overcome. In particular in this respect, a sealing arrangement in accordance with the present invention includes a grommet which can be preassembled with a wiring harness and positioned relative to a connector on the end of the harness so that when the shield is installed in a vehicle door panel the grommet is accurately positioned for sealing engagement with the shield. Advantageously, the grommet provides for the wiring harness to have an enlarged electrical connector on one end thereof for passing through the opening in the shield while, at the same time, providing for sealing interengagement between the grommet and shield in connection with the mounting of the wiring harness and grommet on the shield. This advantageously enables the shield to be mounted on a door panel prior to completing the interconnection between the grommet and shield which is achieved by pushing or pulling the electrical connector and corresponding end of the wiring harness through the opening from the wet toward the dry side of the shield and then pulling the grommet into sealing interengagement with the shield. In accordance with another aspect of the invention, the grommet, which is of a resilient material, provides rigidity for the support of the wires relative to that afforded by a plurality of pocket corrugations while, at the same time, enabling both axial and lateral displacement of the wires relative to the shield to facilitate both the installation of the wires and the displacement of the wires relative to the shield and door panel as may be necessary to accommodate the wires in the door panel. Still further, a conductor mounting and sealing arrangement in accordance with the invention advantageously facilitates the removal and/or replacement of the wiring harness easily, and without damaging the shield, should such removal or replacement become necessary.

It is accordingly an outstanding object of the present invention to provide an improved sealing arrangement in connection with the mounting of electrical conductors in an opening through a substrate such as a watershield component exposed to different environmental conditions on the opposite sides thereof.

Another object is the provision of a sealing arrangement of the foregoing character which includes a grommet which facilitates the mounting of electrical conductors having an enlarged electrical connector on one end thereof relative to a shield component having an opening therethrough at least as large as that of the electrical connector.

Still another object is the provisions of a grommet which provides for stabilizing the electric wires relative to the shield while allowing axial and lateral displacement of the wires relative to the shield.

Another object is a provision of a grommet of the foregoing character which enables the sealing interengagement between electrical wires, a wiring harness, or the like and a shield component to be achieved quicker, and more efficiently than heretofore possible while optimizing the obtaining and maintaining of a desired sealed relationship between the wires and the opposite sides of the shield.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings, in which:

FIG. 2 is a front elevation view of the grommet shown, in FIG. 1;

FIG. 3 is a sectional elevation view of the grommet taken along line 3—3 in FIG. 2; and, FIG. 4 is a side elevation view, partially in section, of another embodiment of a grommet according to the invention.

DESCRIPTION OF PREFERRED EMBODIMENTS

Figure 1:
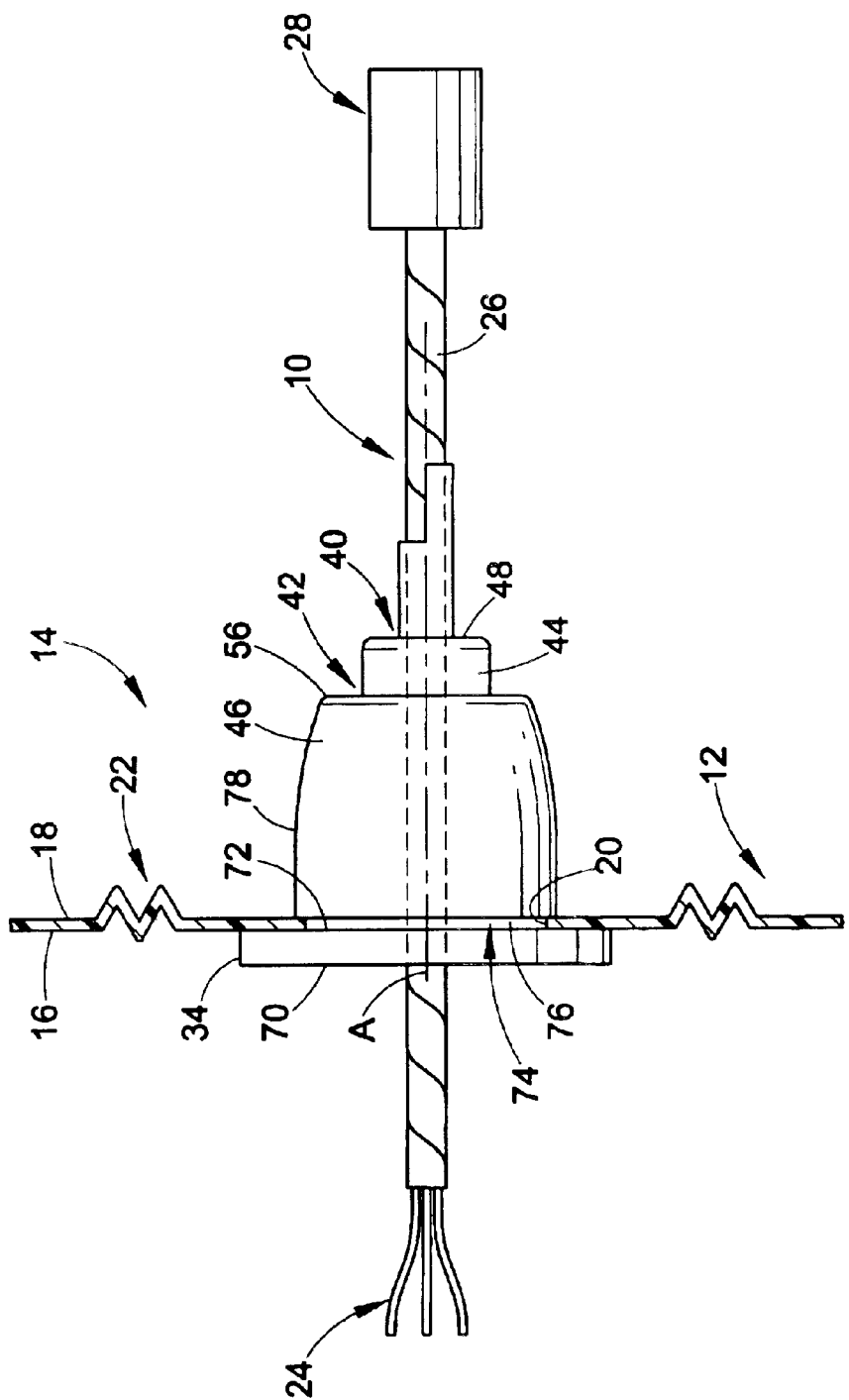
FIG. 1 is a side elevation view, partially in section, of a grommet according to the invention and showing the grommet sealingly mounting a wiring harness relative to a watershield.

Referring now in greater detail to the drawings, wherein the showings are for the purpose of illustrating preferred embodiments of the invention only, and not for the purpose of limiting the invention, FIG. 1 illustrates a wiring harness 10 mounted on a watershield 12 by means of a grommet 14 which is also shown in FIGS. 2 and 3 of the drawing. Watershield 12 is of a suitable plastic material, such as polyethylene, and has wet and dry sides 16 and 18, respectively. The shield is provided with an opening 20 having an axis A and, preferably but not necessarily, opening 20 is surrounded by a plurality of corrugations 22 similar to those described in the aforementioned patents and which provide added flexibility for the wiring harness mounting. Wiring harness 10 comprises a plurality of electrical conductors 24 wrapped in electrical tape 26 and having an electrical connector 28 on the end thereof which is on the dry side of the shield. It will be appreciated that connector 28 can be a male, female or combined connector for electrically connecting the wiring harness with a mating connector in the electrical system of the vehicle.

Grommet 14, in the embodiment illustrated in FIGS. 1–3, is tubular and preferably cylindrical and is made of a suitable resilient material such as rubber or an artificial rubber such as neoprene. Grommet 14 has an axis 30 which is coaxial with axis A when the grommet is mounted on shield 12, and the grommet includes axially opposite first and second ends respectively in the form of a tube 32 and a flange 34. End 32 is of a diameter for receiving and tightly interengaging with wiring harness 10 and has a semi-circular finger tab 36 extending axially outwardly therefrom and an inner end 38. The grommet includes a wall between ends 32 and 34 comprising first and second re-entrant wall portions 40 and 42, respectively, which face end 32, a first connecting wall portion 44 between the re-entrant wall portions, and a second connecting wall portion 46 between second re-entrant wall portion 42 and end 34 of the grommet. Re-entrant wall portion 40 has axially outer and inner ends 48 and 50, respectively, and is defined by a radially inner wall 52 extending from inner end 38 of end portion 32 and a radially outer wall 54 connected to the axially outer end of connecting wall portion 44. Second re-entrant wall portion 42 has axially outer and inner ends 56 and 58, respectively, and is defined by a radially inner wall 60 extending from the inner end 62 of connecting wall portion 44 and a radially outer wall portion 64 connected to the axially outer end of connecting wall portion 46.

As will be appreciated from FIG. 3, end 32 of the grommet, the radially inner and outer walls of the re-entrant wall portions and connecting wall portions 44 and 46 are coaxial with and generally parallel to axis 30 of the grommet. As will be further appreciated from FIG. 3, the second re-entrant wall portion 42 is radially outwardly of first re-entrant wall portion 40 and axially offset therefrom in the direction from end 32 towards end 34 of the grommet. Moreover, the radially inner and outer walls of the two re-entrant wall portions and end 32 of the grommet are of the same radial thickness while wall 46 has a radial thickness at end 32 which is several times greater than that of the walls of the re-entrant wall portions and end 32. Furthermore, connecting wall portion 46 has radially outer and inner surfaces 78 and 80, respectively, which converge relative to axis 30 in the direction from end 34 toward end 32 of the grommet, and outer surface 78 converges relative to inner surface 80 in the latter direction for the connecting wall portion to have a radial thickness at end 56 of re-entrant wall portion 42 corresponding to that of radially outer wall 64 of the re-entrant wall portion. Connecting wall portion 46 provides rigidity and stability for the grommet relative to shield 12 when the grommet is mounted thereon, and end 32 and re-entrant wall portions 40 and 42 provide for the wiring harness to be axially and laterally displaceable relative to wall portion 46 and the shield.

Flange 34 providing the second end of the grommet is a radially outwardly extending peripheral flange having radially inner and outer peripheral surfaces 66 and 68, respectively, and axially outer and inner planar faces 70 and 72, respectively. Surfaces 66 and 68 are respectively diametrically smaller and larger than the diameter of opening 20 in shield 12 and, in the embodiment illustrated in FIGS. 1–3, connecting wall portion 46 is provided with a radially inwardly extending peripheral recess 74 adjacent innerface 72 of the flange. As will be appreciated from FIG. 1, recess 74 is adapted to sealing interengage with the peripheral edge of opening 20 in shield 12 and, for this purpose, the recess includes a bottom wall 76 for engaging with the peripheral edge of the opening.

FIG. 4 illustrates a grommet 14A according to the invention which is dimensionally smaller than grommet 14 and, with one exception, is structurally identical to grommet 14. Accordingly, parts of grommet 14A corresponding to grommet 14 are identified by like reference numerals in FIG. 4 of the drawing. With regard to the dimensional differences, connecting wall portion 46 of the embodiment shown in FIG. 4 is axially shorter than that of connecting wall portion 46 in the embodiment of FIGS. 1–3, whereby the overall length of grommet 14A is shorter than that of grommet 14, and the radial thickness of connecting wall portion 46 adjacent face 72 of flange 34 in the embodiment of FIG. 4 is slightly less than the radial thickness of wall portion 46 in the embodiment of FIGS. 1–3 axially forwardly adjacent recess 74. With regard to the structural difference, grommet 14A is provided with a second radially outwardly extending circumferential flange 82 spaced forwardly of face 72 of flange 34 so as to provide a recess 84 with outer surface 78 of the connecting wall portion. It will be appreciated that the axial and radial dimensions of recesses 74 and 84 of grommets 14 and 14A will be as required for sealing interengagement with an opening in a watershield or other wall, panel or plate on which the grommet is to be mounted.

In use, as will be appreciated from the drawings and the description herein, the grommet is mounted on wiring harness 10, such as at the time of manufacture, and is located on the harness so as to be in the correct location for connection with the substrate component on which it is to be mounted which, in the illustrated embodiment, is watershield 12 to be mounted on a vehicle door inner panel. When the watershield has been so mounted, the installer accesses the connector 28 by reaching through to the wet side 16 of the watershield, pulls the latter and the wiring harness through the opening toward the dry side 18 of the shield and then grasps and pulls grommet 14 or 14A outwardly of side 18 for the peripheral edge of opening 20 to engage in the grommet recess with face 72 of flange 34 of the grommet engaging against the wet side of the shield. In addition to, or as an alternative to sealingly interengaging the grommet and shield through the use of a recess in the grommet, the planar side 72 of flange 34, or the side 16 of the shield adjacent the periphery of opening 20 can be provided with an adhesive for sealingly bonding the grommet in place. It will be appreciated, of course, that if an adhesive sealing and bonding mounting is to be used, it would not be necessary for grommet 14 to have recess 74 therein or for grommet 14A to have flange 82 on wall portion 46 thereof. It will be further appreciated that if the mounting arrangement is through the use of a recess in the outer surface of the grommet, or a recess defined by a second flange on the outer surface, the outer diameter of flange 34 can be equal to and preferably slightly larger than the diameter of outer surface 78 of the grommet at the end thereof adjacent the flange. A diameter larger than that of surface 78 is preferred to optimize the resistance against pulling the grommet through opening 20 during installation. It will be appreciated that these dimensional variations will depend at least in part on the material of the watershield or other component onto which the grommet is to be mounted and the thickness thereof about the mounting opening.

While considerable emphasis has been placed herein on preferred embodiments of the invention, it will be appreciated that other embodiments can be made and that modifications can be made to the preferred embodiments without departing from the principals of the invention. In particular in this respect, it will be appreciated that the grommet may include one, or more than two, re-entrant wall portions between the opposite ends thereof. The foregoing and other modifications will be obvious or suggested to others upon a reading and understanding of the disclosure herein, whereby it is to be distinctly understood that the foregoing descriptive matter is to be interpreted merely as illustrative of the invention and not as a limitation.

Having thus described the invention, it is so claimed:

1. A grommet for sealing a conductor relative to a substrate having opposite sides and an opening therethrough for a conductor, said grommet being tubular and of a resilient material and having axially opposite ends, one of said ends for sealingly engaging with a conductor and the other of said ends having an inner surface radially spaced from the conductor and an outer surface diametrically larger than the opening through the substrate, said inner and outer surfaces converging in the direction from said other end toward said one end, and said other of said ends including a radially extending peripheral flange having radially inner and outer peripheral surfaces respectively diametrically smaller and larger than the opening through the substrate.

2. The grommet according to claim 1, wherein said flange has an axially outer face and an axially inner face spaced therefrom in the direction toward said one end.

3. The grommet according to claim 2, wherein said inner face is planar.

4. The grommet according to claim 2, wherein said other end includes a radially inwardly extending peripheral recess adjacent said inner face of said flange.

5. The grommet according to claim 4, wherein said recess has a bottom diametrically dimensioned for sealing with the opening through the substrate.

6. A grommet for sealing a conductor relative to a substrate having opposite sides and an opening therethrough for a conductor, said grommet being tubular and of a resilient material and having axially opposite ends, one of said ends for sealingly engaging with a conductor and the other of said ends being radially spaced from the conductor and diametrically larger than the opening through the substrate, and a wall between said one and said other end having at least one re-entrant wall portion therein.

7. The grommet according to claim 6, wherein said one end has an axially inner end and said re-entrant wall portion is at said inner end.

8. The grommet according to claim 6, wherein said at least one re-entrant wall portion is a first re-entrant wall portion, and a second re-entrant wall portion between said first re-entrant wall portion and said other end of said grommet.

9. The grommet according to claim 8, wherein said one end has an axially inner end and said first re-entrant wall portion is at said inner end.

10. The grommet according to claim 9, wherein said second re-entrant wall portion is radially outwardly of said first en-entrant wall portion and axially offset therefrom in the direction toward said other end.

11. The grommet according to claim 10, wherein said other of said ends includes a radially extending peripheral flange having radially inner and outer peripheral surfaces respectively diametrically smaller and larger than the opening through the plate, said flange having an axially outer face and an axially inner face spaced therefrom in the direction toward said one end, and said inner face being planar.

12. The grommet according to claim 11, wherein said other end includes a radially inwardly extending peripheral recess adjacent said inner face of said flange.

13. The grommet according to claim 6, wherein said wall includes a connecting wall portion extending from the other end of the grommet toward said one end thereof, said connecting wall portion having a radial thickness greater than that of the at least one re-entrant wall portion.

14. The grommet according to claim 13, wherein said at least one re-entrant wall portion is a first re-entrant wall portion, and a second re-entrant wall portion between said first re-entrant wall portion and said other end of said grommet.

15. The grommet according to claim 14, wherein said radial thickness of said connecting wall portion is greater than that of each said first and second re-entrant wall portion.

16. The grommet according to claim 15, wherein said one end has an axially inner end and said first re-entrant wall portion is at said inner end, said second re-entrant wall portion is radially outwardly of said first en-entrant wall portion and axially offset therefrom in the direction toward said other end, and said connecting wall portion extends from said second re-entrant wall portion toward said other end of said grommet.

17. The grommet according to claim 15, wherein said other of said ends includes a radially extending peripheral flange having radially inner and outer peripheral surfaces respectively diametrically smaller and larger than the opening through the plate, said flange having an axially outer face and an axially inner face spaced therefrom in the direction toward said one end, and said inner face being planar.

18. The grommet according to claim 17, wherein said other end includes a radially inwardly extending peripheral recess adjacent said inner face of said flange.

19. The grommet according to claim 6, wherein said other of said ends includes a radially extending peripheral flange having radially inner and outer peripheral surfaces respectively diametrically smaller and larger than the opening through the substrate plate and said flange has an axially outer face and an axially inner face spaced therefrom in the direction toward said one end.

20. The grommet according to claim 19, wherein said inner face is planar.

21. The grommet according to claim 19, wherein said other end includes a radially inwardly extending peripheral recess adjacent said inner face of said flange.

* * * * *